Feb. 23, 1937.  W. R. WALNE  2,071,778
DIESEL DRIVE FOR OIL WELLS
Filed Aug. 31, 1935  3 Sheets-Sheet 1

INVENTOR
WILLIAM R. WALNE
BY
ATTORNEY

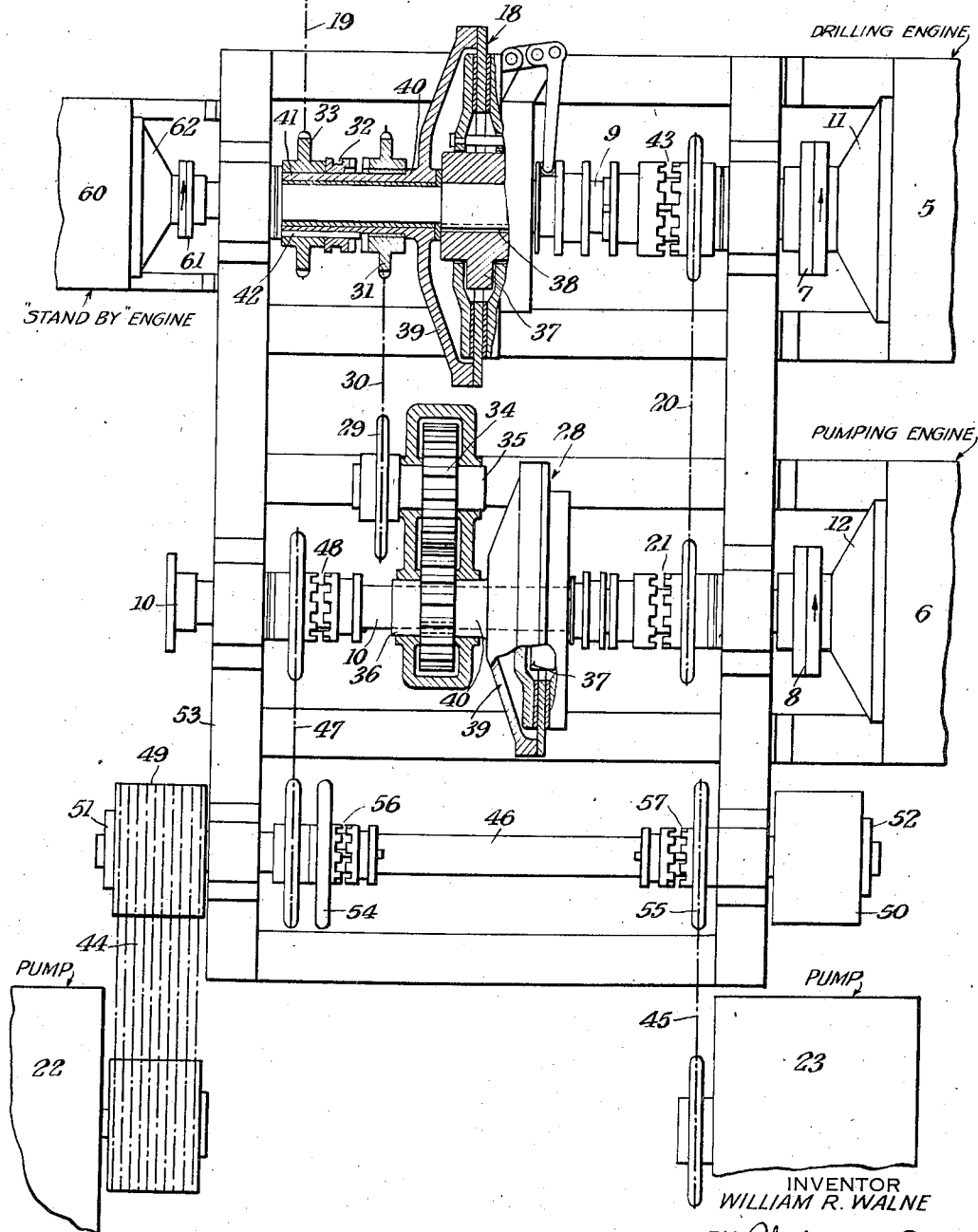

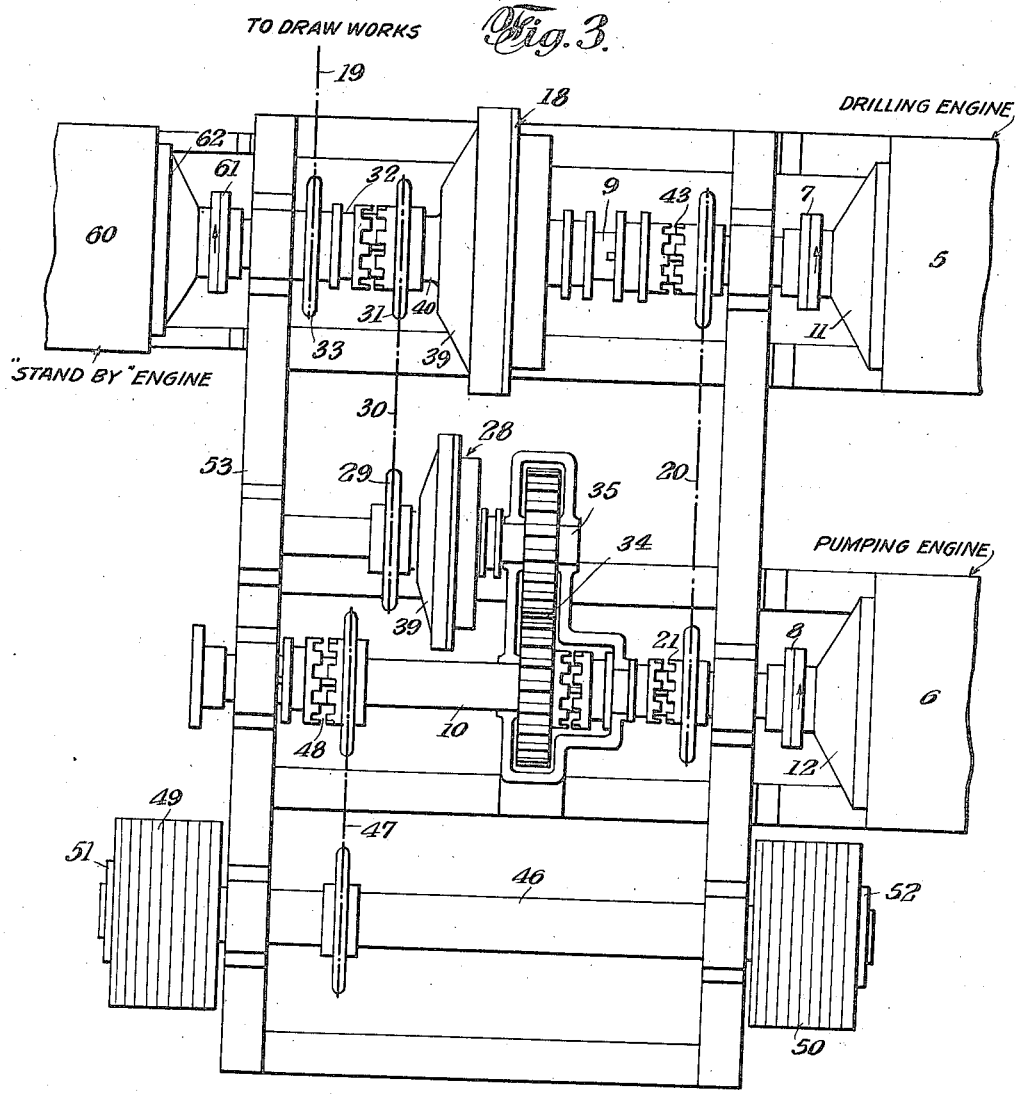

Patented Feb. 23, 1937

2,071,778

UNITED STATES PATENT OFFICE 2,071,778

DIESEL DRIVE FOR OIL WELLS

William R. Walne, Houston, Tex.

Application August 31, 1935, Serial No. 38,743

18 Claims. (Cl. 255—19)

This invention relates to the drilling of oil wells by internal combustion engines, particularly Diesel engines.

Diesel engine drives as heretofore designed have taken up considerable space and have required relatively heavy units, complicated controls, have been quite expensive and have been difficult of repair and replacement of parts.

The objects of the present invention are to provide a Diesel drive which will be free of the foregoing and other objections, which will be compact in its arrangement of parts and take up less space than has heretofore been required; which will be more efficient and more quickly responsive, particularly for reversal in certain drilling operations, which will consist of fewer parts and weigh less; which will be less expensive and which will be readily adaptable to present units such as engines and pumps now in use.

These various objects and other desirable objects are attained in the present invention by the novel features of construction, combinations and relations of parts hereinafter described, illustrated in the accompanying drawings and broadly covered in the claims.

The drawings accompanying and forming part of the specification show by way of illustration several different embodiments of the invention, but it will be understood that the structure is capable of further modification to suit special requirements or conditions, all within the true and intended scope of the invention.

Figs. 2 and 3 are broken plan and part sectional views on a larger scale illustrating other modifications of the invention.

Figure 1:
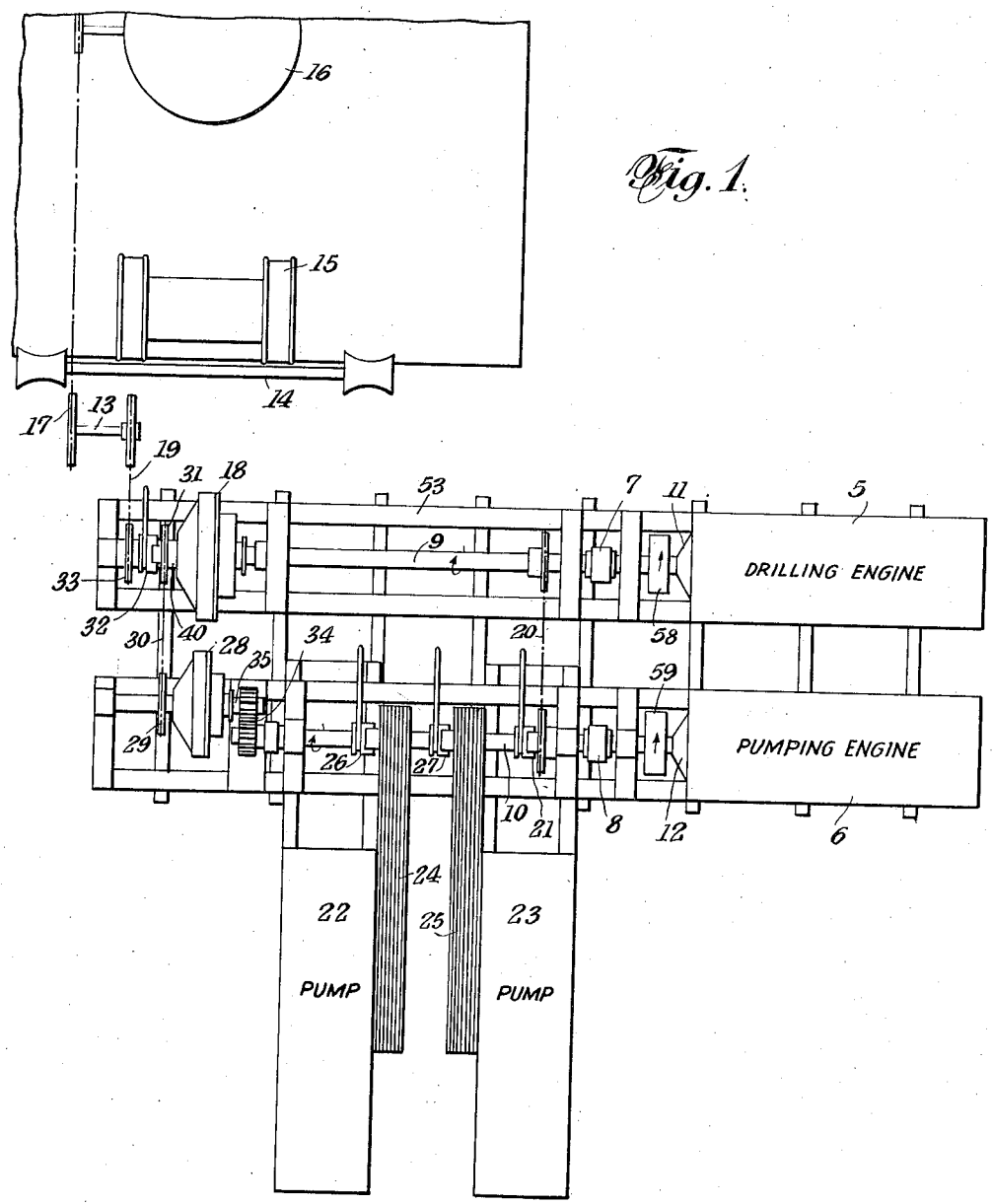
Fig. 1 is a broken partial plan and somewhat diagrammatic illustration of one embodiment of the invention.

In the several forms of the invention illustrated, two engines are employed, usually identified as a drilling engine 5, and a pumping engine 6. These preferably and usually are duplicate engines of like horsepower, both turning in the same direction, so as to be completely interchangeable either as a whole or as to parts.

These engines are shown mounted closely adjoining in parallel relation and connected as by couplings 7, 8, with parallel shafting 9, 10. The connections at 7, 8, may be flexible couplings as indicated in Fig. 1 or simply engine flange couplings as indicated in Figs. 2 and 3.

The engines preferably have the usual built in clutches such as indicated at 11, 12, so that they may be independently cut in and out, as required.

The draw-works is indicated in Fig. 1, as including a jack shaft 13, a line shaft 14, and a drum 15, and the rotary is indicated at 16, driven by sprocket gearing 17, from the jack shaft.

The drive of the draw-works and rotary is effected from the shaft 9, through a friction clutch 18, and sprocket chain connections 19, to the jack shaft 13.

The two engines may be compounded for heavy duty operations as when hoisting the pipe out of the hole, by the sprocket chain connections 20, between the two shafts 9, 10. This power compounding connection may be controlled by clutch indicated at 21, on the pump engine shafting 10. The clutch 18, on the drilling engine shafting 9, is of a size to carry the full power of both the engines.

Two slush pumps are indicated at 22, 23, operated both in Fig. 1 by Tex-rope or multiple chain drive connections 24, 25, from the pumping engine shafting 10, under control respectively of clutches 26, 27.

By means of these clutches either one or both the pumps may be driven from the pumping engine shafting 10. With clutch 21 thrown in, the power of the drilling engine may be added to operate either one or both the pumps and with the clutch 12 of the pumping engine thrown out, either one or both the pumps may then be operated from the drilling engine alone.

With clutch 21 engaged, the power of both engines may be applied to the draw-works and the rotary and with the drilling engine clutch 11 out, the pumping engine alone may be used to drive the draw-works and rotary. Accordingly, it will be seen that either or both engines may be utilized to drive either or both pumps or to drive the draw-works and rotary.

For reverse drive of the draw-works and rotary, a reverse drive clutch 28 is shown, operating a pinion 29, connected by sprocket chain 30, to a pinion 31, which can be coupled by a clutch 32, to drive the pinion 33, of the draw-works chain drive 19.

The reversal of motion is accomplished in the illustration by the motion reversing gearing 34, between the pump engine shafting 10 and the reverse drive shaft 35.

In Figs. 1 and 3, both the reverse clutch 28 and the reverse drive pinion 29 are shown mounted on this reverse drive shaft 35, but as indicated in Fig. 2, the reverse drive clutch may be mounted on the pumping engine shaft 10, and only the reverse drive sprocket 29 be mounted on shaft 35, in which event, the first of the reversing gears 34, is fixed on the hub 36 of the reverse drive clutch 28.

Reverse drive of the draw-works and rotary may be effected from either or both engines, upon throwing out the forward drive clutch and throwing in the reverse driving clutch 28 and the clutch 32 of the final reversing connections.

As the power required for reverse driving operations is usually much less than that required for forward drive, the reverse driving clutch 28 may be considerably smaller than the main, forward driving clutch 18.

Both forward and reverse drive clutches may be of the same general design, as indicated particularly in Fig. 2, embodying an inner driving member 37, keyed on the shaft at 38, and an outer, lighter driven member or "spider" 39, having a hub portion 40, rotatably mounted on the shaft. On the sleeve extension 41, of the hub of the forward drive clutch spider (Fig. 2), the draw-works driving pinion 33 is keyed at 42, and the reverse driving pinion 31 is rotatably supported. The clutch collar 32, for coupling pinion 31 to pinion 33, is slidingly keyed on the spider sleeve 41, as by means of the same key 42, which fixes pinion 33 thereon. It will be seen in Fig. 2 that when clutch collar 32 is shifted to the right into engagement with clutch teeth on the opposing face of sprocket 31, this pinion will be connected in driving relation to the draw-works driving pinion 33. In this reverse driving connection the spider 39 of the forward drive clutch will be turning, but this is not objectionable as it is lighter than the main, shaft-connected driving part of the clutch.

In Fig. 2, an additional clutch is indicated at 43, on the drilling engine shafting 9, by which the power compounding connection 20, between the two engines may be rendered inoperative, to remain at rest as when the two engines are oprating independently, one driving the draw-works and rotary and the other driving the pumps.

In place of the Texrope drives for the pumps, sprocket chain drives may be used. In fact, the units may be equipped for either form of drive as indicated in Fig. 2, where a multiple drive 44, is provided for one pump and a sprocket chain drive 45 for the other pump.

In Figs. 2 and 3, the pumps are driven from a jack shaft 46, operated by chain drive 47, or the like, from the pumping engine shafting 10, under control of clutch 48, on that shafting.

The Texrope drive pulleys 49, 50, with their individual enclosed clutches 51, 52, are shown mounted on the ends of the jack shaft 46, at the outside of the supporting frame or base structure 53, and the chain sprockets 54, 55, with their individual clutches 56, 57, are shown mounted on this shaft, within the frame or base at the inner sides of the shaft bearings. This locates the driving members for the pumps at opposite sides of and closely adjoining the shaft bearings and enables desirable spacing of the pumps no matter which form of drive is employed. The unit can thus be used equally as well with the older style chain driven pumps or with the more modern Texrope driven form of pumps and one unit, as indicated in Fig. 2, may be used to drive both forms of pumps.

As particularly shown in Figs. 2 and 3, all parts, including the drilling engine shafting with the forward drive clutch, the pumping engine shafting, with reverse clutch gear and the pump drive gear may be mounted in compact relation on the same base structure 53, to form a readily transportable power transmission unit, taking up only a reasonable amount of space and which may be directly bolted to the engine beds and pump bases. Relatively short rigid shafting may be employed, with all driving elements between bearings or closely adjoining. The parallel, side-by-side relation of the engines locates them close together where they can be protected under the same comparatively small housing. Also because of such relation, no large or extended foundations are required for either the engines, the power unit or the pumps. The engines, both turning in the same direction, may be fully interchangeable. The shafting and heavy clutch parts always turn in the same direction and these parts never require reversal, so no time is lost or power expended to bring heavy parts to rest and then start them turning in the opposite direction.

To facilitate synchronization in the power compounded relation, to prevent one engine from acting as a drag on the other and to enable one engine to carry the load without the other, forwardly driving free wheeling clutches 58, 59, may be provided on the drilling and pumping engine shafting, substantially as indicated in Fig. 1. With these free wheeling clutches, either engine may carry the load, without the other and in the compounding relation both will apply power to the load.

As indicated in Figs. 2 and 3, a standby engine 60, may be coupled at 61, to the extended end of the drilling engine shafting 9, for emergency or for light operations around the derrick. This may be a relatively low speed, low horsepower gasoline engine, large enough for turning the rotary during ordinary drilling operations. This smaller engine is shown as having a suitable clutch 62, by which it may be cut in or out of service and it is of special utility for light and long continued drilling operations, where the rotary should be turned at relatively low speed and does not require the power of the heavier drilling engine. This being a variable speed, as distinguished from the more or less constant speed Diesel engines, may be employed to turn the rotary at the different speeds considered best for different formations. Also this standby engine in the relation shown in Figs. 2 and 3, may be employed for cranking either one or both the Diesel engines and for performing other services. In addition to the saving in power and wear on parts, etc., the lighter standby engine has the advantage in drilling, that it will stall and thus prevent "twistoffs", whereas the use of a heavier Diesel drilling engine involves the possibility of twistoffs from the greater applied power. The heavier and more powerful engine however is always immediately available for the heavier drilling operations, particularly at the draw-works, both heavy engines are available for the extra power required in pulling out of the hole and if necessary, the smaller standby engine could be used to add its power.

If desired, one or more of the shafts may be extended for power take-off purposes, such for example, the pumping engine shafting 10 in Fig. 2.

The various elements going into the make up of the unit may be of accepted standard design, facilitating assemblage, repairs and replacements and keeping the cost of the unit relatively low. No special reversing clutch with reversely turning parts is required, the reverse drive clutch employed being by preference a duplicate or smaller size form of the main forward drive clutch. The direction reversing spur gears 34, may be completely enclosed and bathed in oil and the sprocket chains and other parts may run in an oil bath, the unit structure making enclosure and lubrication of such parts particularly simple and practical.

What is claimed is:

1. Power mechanism for well drilling purposes, comprising in combination a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine.

2. Power mechanism for well drilling purposes, comprising in combination a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine, said reverse drive connections including further the element of the forward drive clutch which is connected in driving relation with the draw-works and rotary, said forward drive clutch element being reversely rotatable and operable when so driven to effect reverse rotation of draw-works and rotary.

3. Power mechanism for well drilling pnrposes, comprising in combination, a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine, said reverse driving clutch being mounted on the pumping engine extension shafting.

4. Power mechanism for well drilling purposes, comprising in combination, a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine, said direction reversing gearing including a parallel shaft driven by direction reversing gears from the pumping engine extension shafting.

5. Power mechanism for well drilling purposes, comprising in combination, a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine, said direction reversing gearing including a parallel shaft driven by direction reversing gears from the pumping engine extension shafting and said reverse driving clutch being mounted on said parallel reversely turning shaft.

6. Power mechanism for well drilling purposes, comprising in combination, a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine, said engines both turning in the same direction.

7. Power mechanism for well drilling purposes, comprising in combination a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine, said pump driving gearing including a shaft parallel with and driven from the pumping engine extension shafting and pump driving gears and clutches on said parallel shafting.

8. Power mechanism for well drilling purposes, comprising in combination a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine and a single base mounting said shafting, driving gearing and clutches all as one unit.

9. Power mechanism for well drilling purposes, comprising in combination a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine and one way free wheeling clutches between said engines and said extension shafting.

10. Power mechanism for well drilling purposes, comprising in combination, a drilling engine and a pumping engine in parallel side-by-side relation, extension parallel shafting driven by said engines, pump driving gearing operated from the extension shafting of the pumping engine, draw-works and rotary drive gearing operated from the extension shafting of the drilling engine, power compounding connections between the two engines, a main forward drive and power compounding clutch on the extension shafting of the drilling engine and reverse drive connections for the draw-works and rotary including direction reversing gearing and an associated clutch operated from said extension shafting of the pumping engine and a variable lower speed less power standby engine having a clutch connection with the opposite end of said drilling engine extension shafting.

11. A power hook-up for drilling oil wells, comprising in combination with draw-works, rotary and slush pumps, two engines in side-by-side parallel relation and both rotating in the same direction, parallel shafting extending from and driven by said engines, a direct drive from said shafting of one engine to said draw-works and rotary and including a main forward drive clutch on said shafting for carrying the power of either or both engines, pump driving gearing from the other engine shafting to the slush pumps, a parallel shaft driven by direction reversing gearing from said pump driving shafting, reverse driving connections from said reversely driven parallel shaft to the driving gearing for the draw-works and rotary, including clutch means by which said direction reversing connections may be cut into and out of service.

12. A power plant for well drilling purposes, comprising a base, parallel shafting journalled on said base, separate driving engines clutched to the ends of said shafting, power compounding connections between said shaftings, clutch means for controlling said power compounding connections and for enabling the driving of either shafting from the other, main drive connections on one shafting and including a main drive clutch by which power may be transmitted from either one or both shaftings and other drive connections from said other shafting, including clutch means for controlling use of the same.

13. A power plant for well drilling purpose, comprising a base, parallel shafting journalled on said base, separate driving engines clutched to the ends of said shafting, power compounding connections between said shaftings, clutch means for controlling said power compounding connections and for enabling the driving of either shafting from the other, main drive connections on one shafting and including a main drive clutch by which power may be transmitted from either one or both shaftings and other drive connections from said other shafting, including clutch means for controlling use of the same, said other drive connections including a third shaft journalled on said base parallel with said shafting and drive gears and clutch means therefor on said third shaft.

14. A power plant for well drilling purposes, comprising separate engines in parallel side-by-side relation, parallel shafting extending from said engines, clutches for controlling the driving of said shafting from said engines, power compounding connections between said parallel shafting, clutch means for controlling said power compounding connections and for effecting driving of either shafting from the other, main power transmitting connections from one shafting for transmitting the power of either or both engines and including a main power clutch on one shafting and power transmitting connections from the other shafting, including clutch means for control of the same.

15. A power plant for well drilling purposes, comprising separate engines in parallel side-by-side relation, parallel shafting extending from said engines, clutches for controlling the driving of said shafting from said engines, power compounding connections between said parallel shafting, clutch means for controlling said power compounding connections and for effecting driving of either shafting from the other, main power transmitting connections from one shafting for transmitting the power of either or both engines and including a main power clutch on one shafting and power transmitting connections from the other shafting, including clutch means for control of the same and one way drive free wheeling clutches between said engines and shafting.

16. A power plant for well drilling purposes, comprising separate engines in parallel side-by-side relation, parallel shafting extending from said engines, clutches for controlling the driving of said shafting from said engines, power compounding connections between said parallel shafting, clutch means for controlling said power compounding connections and for effecting driving of either shafting from the other, main power transmitting connections from one shafting for transmitting the power of either or both engines and including a main power clutch on one shafting and power transmitting connections from the other shafting, including clutch means for control of the same and reverse driving connections including a clutch and reversely rotating shaft driven from one line of shafting.

17. A power plant for well drilling purposes, comprising separate engines in parallel side-by-side relation, parallel shafting extending from said engines, clutches for controlling the driving of said shafting from said engines, power compounding connections between said parallel shafting, clutch means for controlling said power compounding connections and for effecting driving of either shafting from the other, main power transmitting connections from one shafting for transmitting the power of either or both engines and including a main power clutch on one shafting and power transmitting connections from the other shafting, including clutch means for control of the same, a stand-by engine and means for coupling same with one end of one line of shafting.

18. A power plant for well drilling purposes, comprising separate engines in parallel side-by-side relation, parallel shafting extending from said engines, clutches for controlling the driving of said shafting from said engines, power compounding connections between said parallel shafting, clutch means for controlling said power compounding connections and for effecting driving of either shafting from the other, main power transmitting connections from one shafting for transmitting the power of either or both engines and including a main power clutch on one shafting and power transmitting connections from the other shafting, including clutch means for control of the same, reverse driving connections associated with the shafting and one direction free wheeling clutch means on one line of shafting.

WILLIAM R. WALNE.